United States Patent
Chan et al.

(10) Patent No.: US 10,037,597 B2
(45) Date of Patent: Jul. 31, 2018

(54) IMAGE INPAINTING SYSTEM AND METHOD FOR USING THE SAME

(71) Applicant: INDUSTRIAL TECHNOLOGY RESEARCH INSTITUTE, Hsin-Chu (TW)

(72) Inventors: Sheng-Wei Chan, Taipei (TW); Che-Tsung Lin, Hsinchu (TW)

(73) Assignee: INDUSTRIAL TECHNOLOGY RESEARCH INSTITUTE, Hsin-Chu (TW)

( * ) Notice: Subject to any disclaimer, the term of this patent is extended or adjusted under 35 U.S.C. 154(b) by 303 days.

(21) Appl. No.: 14/982,775

(22) Filed: Dec. 29, 2015

(65) Prior Publication Data

US 2017/0132764 A1 May 11, 2017

(30) Foreign Application Priority Data

Nov. 6, 2015 (TW) .............................. 104136709 A

(51) Int. Cl.
*B60R 11/04* (2006.01)
*B60S 1/08* (2006.01)
(Continued)

(52) U.S. Cl.
CPC .............. *G06T 5/005* (2013.01); *G06T 5/002* (2013.01); *H04N 5/217* (2013.01);
(Continued)

(58) Field of Classification Search
USPC ........................................................ 348/148
See application file for complete search history.

(56) References Cited

U.S. PATENT DOCUMENTS

| 6,535,242 B1 * | 3/2003 | Strumolo ................ B60R 11/04 348/148 |
| 7,009,638 B2 * | 3/2006 | Gruber ................... G01C 11/02 348/144 |

(Continued)

FOREIGN PATENT DOCUMENTS

| CN | 102685516 A | 9/2012 |
| CN | 103905741 A | 7/2014 |

(Continued)

OTHER PUBLICATIONS

Intellectual Property Office, Ministry of Economic Affairs, R. O. C, "Office Action", dated Apr. 18, 2017, Taiwan.

(Continued)

*Primary Examiner* — Deirdre Beasley
(74) *Attorney, Agent, or Firm* — Locke Lord LLP; Tim Tingkang Xia, Esq.

(57) ABSTRACT

An image inpainting method includes the following steps: segmenting image, acquiring a plurality of images, and having the plurality of images segment into noise-contained pixel images and non-noise-contained pixel images, and confirming the positions of every noise pixel of the noise pixel image; and performing inpainting in light of the noise-contained pixel images, finding out the offset map and geometric relationship of the pixel corresponding relationship without being subjected to the affection of noise and having the pixel corresponding relationship with minimum parallax, making use of the offset map or the geometric relationship to extract corresponding pixel that is not subjected to the affection of noise, performing inpainting and substituting the noise pixel in the plurality of images to generate at least a synthetic image without containing noise.

21 Claims, 14 Drawing Sheets

(51) Int. Cl.
| | |
|---|---|
| *G06T 3/40* | (2006.01) |
| *G06T 5/00* | (2006.01) |
| *G06T 5/30* | (2006.01) |
| *G06T 5/40* | (2006.01) |
| *G06T 7/00* | (2017.01) |
| *H04N 5/217* | (2011.01) |
| *H04N 5/225* | (2006.01) |
| *H04N 5/247* | (2006.01) |

(52) U.S. Cl.
CPC . *H04N 5/2171* (2013.01); *G06T 2207/10021* (2013.01); *G06T 2207/10024* (2013.01); *G06T 2207/20224* (2013.01); *G06T 2207/30252* (2013.01); *H04N 5/2257* (2013.01); *H04N 5/247* (2013.01)

(56) References Cited

U.S. PATENT DOCUMENTS

| | | | | |
|---|---|---|---|---|
| 7,643,911 | B2* | 1/2010 | Ishihara | B60R 1/00 701/1 |
| 8,324,552 | B2* | 12/2012 | Schofield | G05D 1/0244 250/208.1 |
| 8,436,902 | B2* | 5/2013 | Kuehnle | G01W 1/14 348/142 |
| 8,823,796 | B2* | 9/2014 | Shen | H04N 7/181 348/148 |
| 9,076,214 | B2* | 7/2015 | Tsutsumi | G01S 5/16 |
| 9,087,256 | B2* | 7/2015 | Yu | H04N 7/18 |
| 2003/0137586 | A1* | 7/2003 | Lewellen | H04N 7/181 348/148 |
| 2011/0273582 | A1* | 11/2011 | Gayko | G06T 5/005 348/222.1 |
| 2016/0364620 | A1* | 12/2016 | Akiyama | H04N 7/188 |
| 2017/0064221 | A1* | 3/2017 | Taylor | H04N 5/332 |

FOREIGN PATENT DOCUMENTS

| | | |
|---|---|---|
| CN | 103935293 A | 7/2014 |
| TW | I306816 B | 3/2009 |
| TW | 201113831 A | 4/2011 |
| TW | M436598 U | 9/2012 |
| TW | 201426635 A | 7/2014 |
| TW | I494899 B | 8/2015 |

OTHER PUBLICATIONS

Ruzic, T. et al., Context-Aware Patch-Based Image Inpainting Using Markov Random Field Modeling, IEEE Transactions on Image Processing, 2015, 444-456.

Rao, T. J. V .S., et al., Image inpainting with group based sparse representation using self adaptive dictionary learning, International Conference on Signal Processing and Communication Engineering Systems, 2015, 301-305.

Akin, A. et al., Trinocular adaptive window size disparity estimation algorithm and its real-time hardware, International Symposium on VLSI Design, Automation and Test, 2015, 1-4.

Zucheul Lee et al., Multi-Array Camera Disparity Enhancement, IEEE Transactions on Multimedia, 2014, 2168-2177.

Dao Nam Anh et al., An Adaptive Bilateral Filter for Inpainting, 2014 Fourth International Conference of Emerging Applications of Information Technology, 2014, 237-242.

Ebdelli, M. et al., Video Inpainting With Short-Term Windows: Application to Object Removal and Error Concealment, IEEE Transactions on Image Processing, 2015, 3034-3047.

* cited by examiner

IMAGE INPAINTING SYSTEM AND METHOD FOR USING THE SAME

CROSS REFERENCE TO RELATED APPLICATION

This application also claims priority to Taiwan Patent Application No. 104136709 filed in the Taiwan Patent Office on Nov. 6, 2015, the entire content of which is incorporated herein by reference.

TECHNICAL FIELD

The disclosure relates to an image inpainting system and method for using the same, and more particularly, to an image inpainting system and method for using the same that is capable of removing noise in the image to improve the driving safety.

BACKGROUND

The motor vehicles, such as cars or motorcycles, are widely used in our daily life. Since the driver of the motor vehicle judges the surrounding objects by naked eyes, there are problems of misjudgment and too-late-reaction.

The currently prevailing warning system, which is capable of overcoming the above-mentioned problems, for example, after being installed on vehicle's windshield, is to shoot on the images in front of the vehicle and identify the obstacles and hazardous objects in the images in order to remind the driver of keeping safety distance or avoid hazardous driving behavior.

However, the recognition rate of the currently existing warning system will be lowered in large degree during the bad weather such as rainy days since the noise in the images such as the back-and-forth swinging windshield wipers, rain drops, or the slurry may block the recognition targets of the existing safety warning system where the recognition target is the pedestrians, vehicle or traffic signals. Since the above-mentioned obstacles might generate misjudgment for the existing warning system, the driver might be in hazardous environment in this kind of driving situation.

The common technology employs a single camera to perform inpainting work for the periodic noise of the wipers in the images in the front by the use of the no-wiper image at different time stages so as to generate transparent images of the wipers. Although the above-mentioned method employs images in multiple time stages to perform inpainting work, it is quite possible that the images intended to perform inpainting work contains pedestrians while the reference images intended to acquire for inpainting do not contain pedestrians resulting in no-pedestrian images shown in the images after being performed inpainting.

Another technology employs a multiple channel panoramic camera system having the images acquired perform high speed parallel processing by GPU (Graphics Processing Unit) to achieve high quality image of the functions of splicing, calibration, dimming, compression and transmission. However, there are no noise-inpainting functions in the image overlapped area in this another technology.

A further technology presents to select clear images of camera with different focal lengths to improve distance-measuring effect. However, this further technology is unable to handle the problem that the input image contains noise.

SUMMARY

The disclosure provides an image inpainting system, comprising:

a camera module for acquiring a plurality of images; and an inpainting module coupled to the camera module for receiving the plurality of images from the camera module and having the plurality of images perform a noise detection where the plurality of images are segmented into noise-contained pixel images and non-noise-contained pixel images, confirming the positions of every noise pixel of the noise pixel images, finding out the offset map and geometric relationship of the pixel corresponding relationship without being subjected to the affection of noise and having the pixel corresponding relationship with minimum parallax, making use of the offset map or the geometric relationship to extract corresponding pixel that is not subjected to the affection of noise, performing inpainting and substituting the noise pixel in the plurality of images to generate at least a synthetic image without containing noise.

The disclosure further provides an image inpainting method that includes the following steps: segmenting image, acquiring a plurality of images, and having the plurality of images segment into noise-contained pixel images and non-noise-contained pixel images, and confirming the positions of every noise pixel of the noise pixel image; and performing inpainting in light of the noise-contained pixel images, finding out the offset map and geometric relationship of the pixel corresponding relationship without being subjected to the affection of noise and having the pixel corresponding relationship with minimum parallax, making use of the offset map or the geometric relationship to extract corresponding pixel that is not subjected to the affection of noise, performing inpainting and substituting the noise pixel in the plurality of images to generate at least a synthetic image without containing noise.

BRIEF DESCRIPTION OF THE DRAWINGS

The accomplishment of this and other objects of the disclosure will become apparent from the following description and its accompanying drawings of which.

DETAILED DESCRIPTION OF THE PREFERRED EMBODIMENT

The following descriptions are embodiments of the disclosure employing some particular concrete examples. Those people skilled in the art are capable of easily realizing the advantages and efficacies of the disclosure through the content disclosed by the patent specification of the disclosure.

Figure 1:
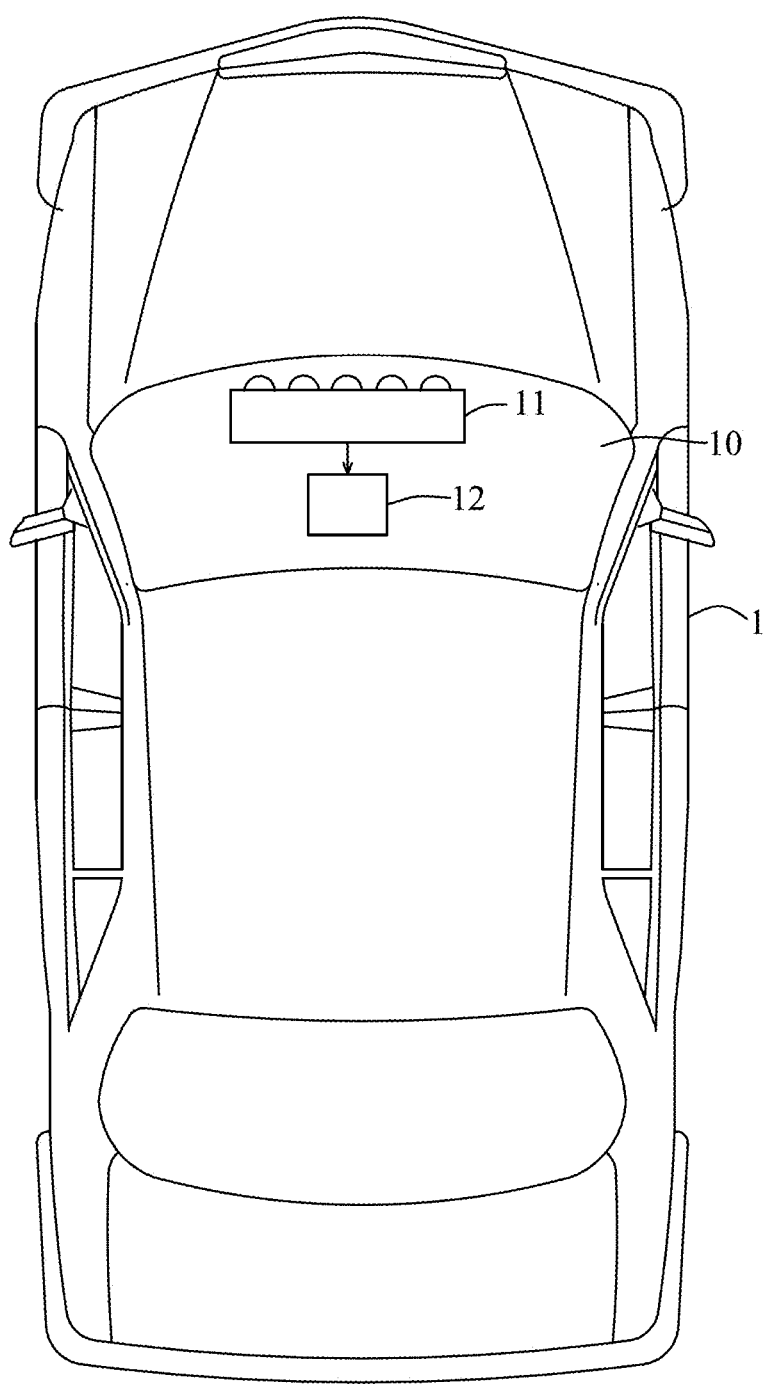
FIG. 1 is a schematic drawing of the motor vehicle of an image inpainting system of the disclosure.
Figure 2:
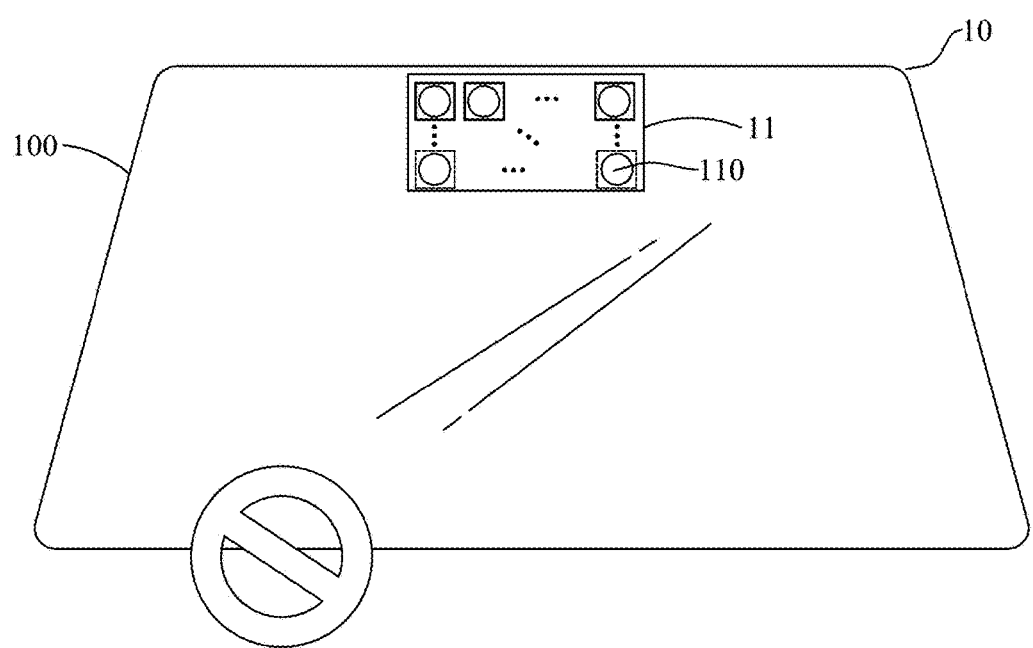
FIG. 2 is a schematic drawing of an image inpainting system at a window of the disclosure.
Figure 3:
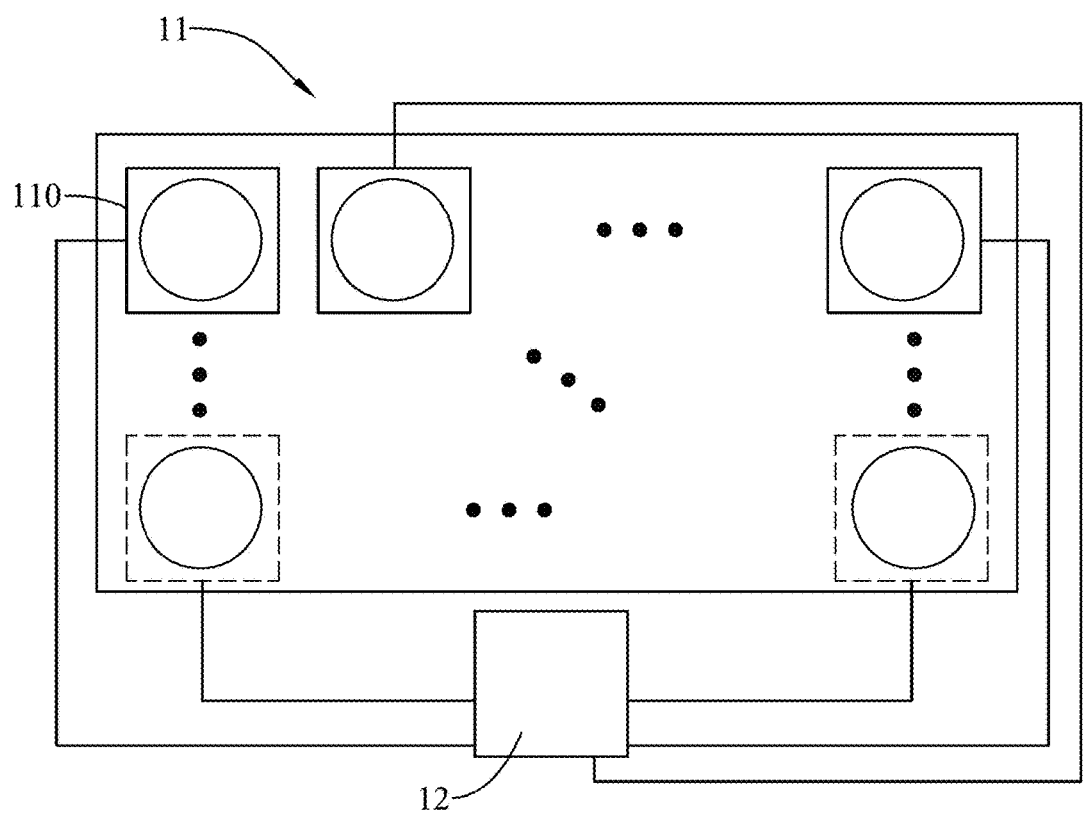
FIG. 3 is a schematic drawing of an image inpainting system of the disclosure.

FIG. 1 is a schematic drawing of the motor vehicle of an image inpainting system of the disclosure; FIG. 2 is a schematic drawing of an image inpainting system at a window of the disclosure; while FIG. 3 is a schematic drawing of an image inpainting system of the disclosure. As shown in FIG. 1, FIG. 2, and FIG. 3, an image inpainting system of the disclosure is applied in motor vehicle. The motor vehicle (1) possesses at least a window (10) which has a furnished surface (100) positioned in the motor vehicle (1). The image inpainting system includes a camera module (11) and an inpainting module (12). As shown in FIG. 1, in the present embodiment, the window (10) is the windshield of the window (1). However, besides being positioned as shown in FIG. 1, the window (1) can be positioned at the front end, rear end, left-hand side, right-hand side or the windows on every side. In the present embodiment, it is especially to emphasize here that it is for facilitating discourse and not for limiting the disclosure in the present embodiment.

As shown in FIG. 2, the camera module (11) being furnished on the furnished surface (100) has at least two camera units (110) that are arranged in array mode.

The camera unit (110) can be an image sensor, an infrared image acquisition device, optical sensing element of either an optoelectronic coupling element or a complementary metal-oxide semiconductor, or at least a combination of both. The discourse here and the above-mentioned camera units (110) are capable of being considered at least a camera. The camera module (11) is used for acquiring a plurality of images from different sources.

Figure 4:
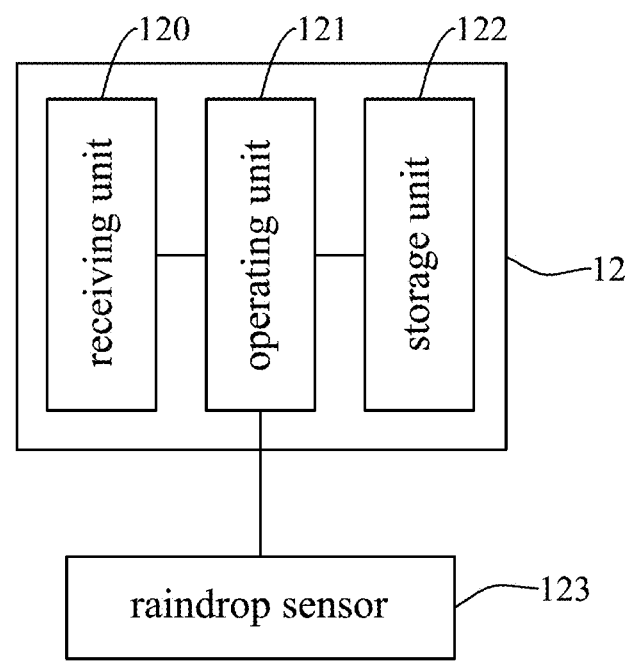
FIG. 4 is a schematic drawing of an inpainting module of the disclosure.

FIG. 4 is a schematic drawing of an inpainting module of the disclosure. As shown in FIG. 3, and FIG. 4, the inpainting module (12) being signally connected to the camera module (11) has a receiving unit (120), an operating unit (121) and a storage unit (122).

The inpainting module (12) can be a programmable integrated circuit micro-controller or field programmable gate array (FPGA). The inpainting module (12) receives the plurality of images from the camera module (11) and have each piece of the images alone in the plurality of images perform a noise detection to obtain the information that how many pieces of images in the plurality of images contains noise, and to learn of the position of the noise pixel in each of the noise-contained images.

In light of the position of the noise pixel in each of the noise-contained images, find out the offset map representing the corresponding relationship in other images by the use of the approximate nearest-neighbor iteration method to find out the offset map representing the corresponding relationship wherein the offset map is respectively corresponding to: noise pixel position and pixel position that is not affected by the noise and possesses minimum parallax, finally, by the use of the offset map to extract the corresponding pixel that is not affected by the noise to have the pixels that are interfered by the noise perform inpainting to generate at least a synthetic image.

To explain further, the inpainting module (12) is capable of applying in any device that possesses operation function. for the following image inpainting methods, safety warning system or the following operating unit (121).

The receiving unit (120) is signally connected to the camera unit (110) to receive the acquired images in a multiplicity of time stages.

The operating unit (120) can be a lane departure warning system (LDWS), a forward collision warning system (FCWS), a traffic sign recognition system (TSRS).

The storage unit (122) being signally connected to the operating unit (121) is capable of storing the synthesis images of the operating unit (121), or images acquired by the camera unit (120), or the resulting images of the warning system.

In an embodiment, the inpainting module (12) can further possesses at least a raindrop sensor (123) which is signally connected to the operating unit (121). The raindrop sensor (123) can be one of the sensor of an optical reflective-type sensor, an audio-type sensor or a conductive-type sensor, or an arbitrary combination among them. The raindrop sensor (123) is used for sensing the wiper's action or the raindrops to actuate the disclosure. Besides, the raindrop sensor (123) is capable of sensing if it is raining outside.

Figure 5:
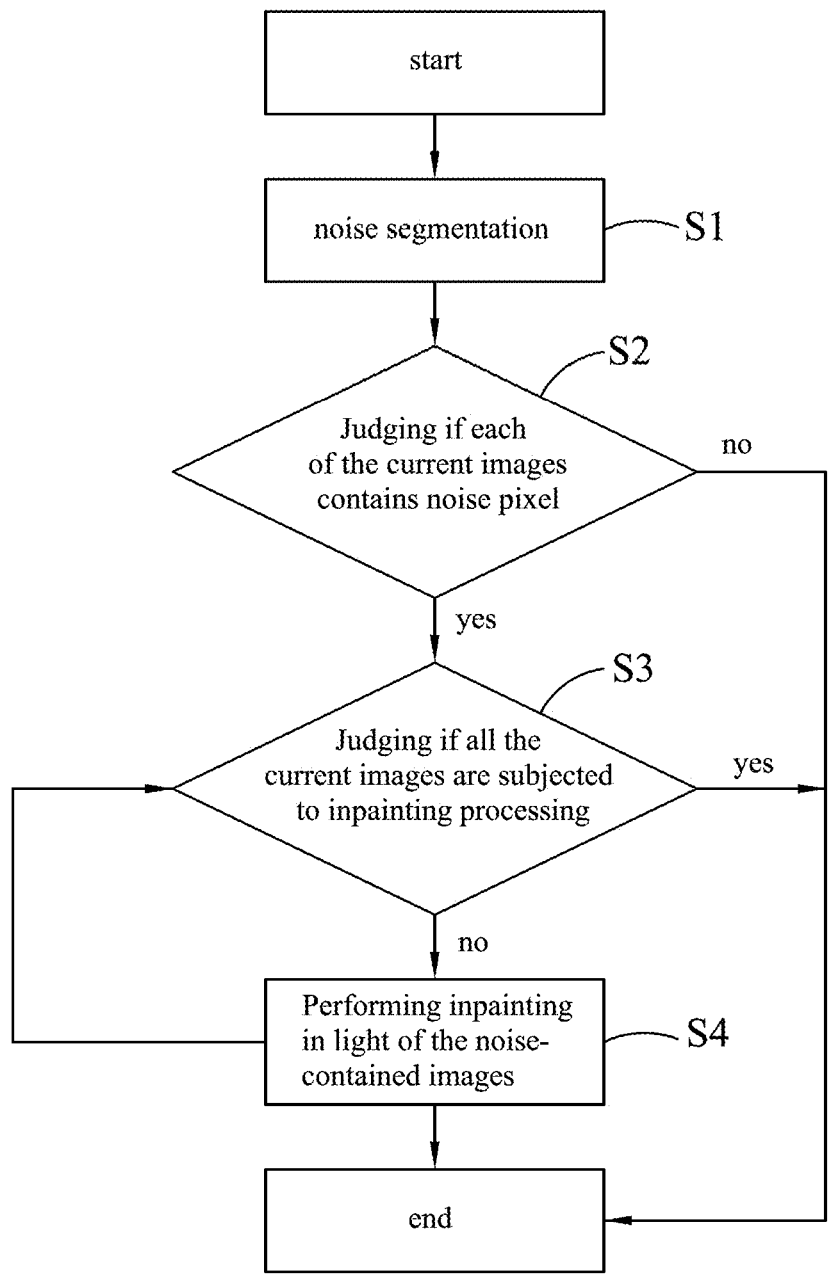
FIG. 5 is a schematic drawing of the flow chart showing the image inpainting method of the disclosure.

FIG. 5 is a schematic drawing of the flow chart showing the image inpainting method of the disclosure. As shown in FIG. 5, the image inpainting method of the disclosure includes the following steps:

If the disclosure possesses the raindrop sensor (123) as shown in FIG. 4, before performing the following step S1, the raindrop sensor (123) is used for sensing if there are any raindrops falling on the window (10), if the answer is yes, the raindrop sensor (123) will have a starting signal give to the inpainting module (12) to perform the following step S1 while the raindrop sensor (123) senses the raindrops, the raindrop sensor (123) also starts the wiper.

What is more, if the raindrop sensor (123) as shown in FIG. 4 is not furnished, then when the wiper is started, the inpainting module will receive a starting signal, it can also perform the following step S1.

S1: noise segmentation which possesses at least three embodiments. They will be clearly described as follows:

The camera module (11) acquires a plurality of images of a multiplicity of time points through the window (10), and has the images transmit to the receiving unit (120) which again to have those images transmit to the operating unit (121) to make the operating unit (121) perform image segmentation with respect to those images and confirm the position of the noise pixel in the images. As depicted follows, the noise pixels can be one of or at least a combination of two of the followings: wiper pixel, raindrop pixel or dirty pixel.

Figure 6:
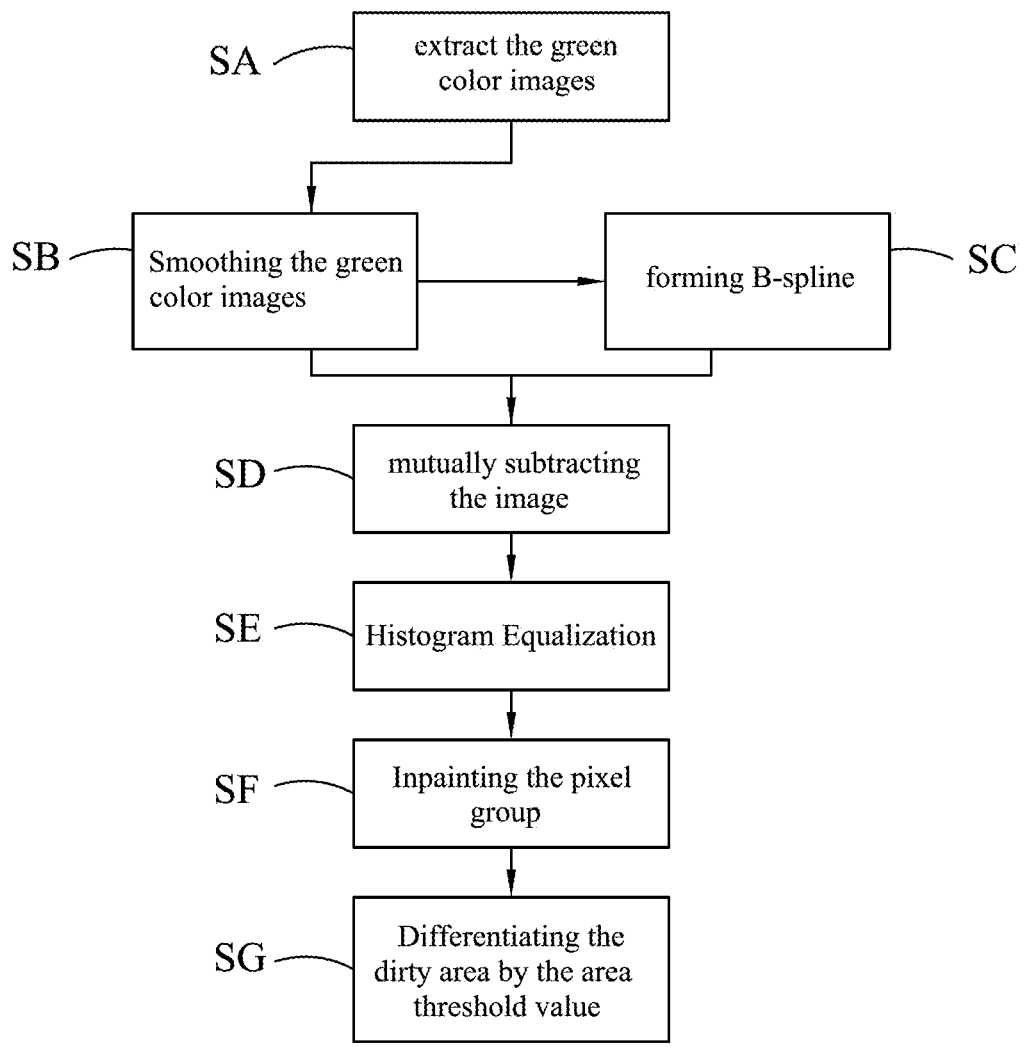
FIG. 6 is a schematic drawing of the flow chart showing the image segmentation method of the first embodiment of the disclosure.
Figure 7:
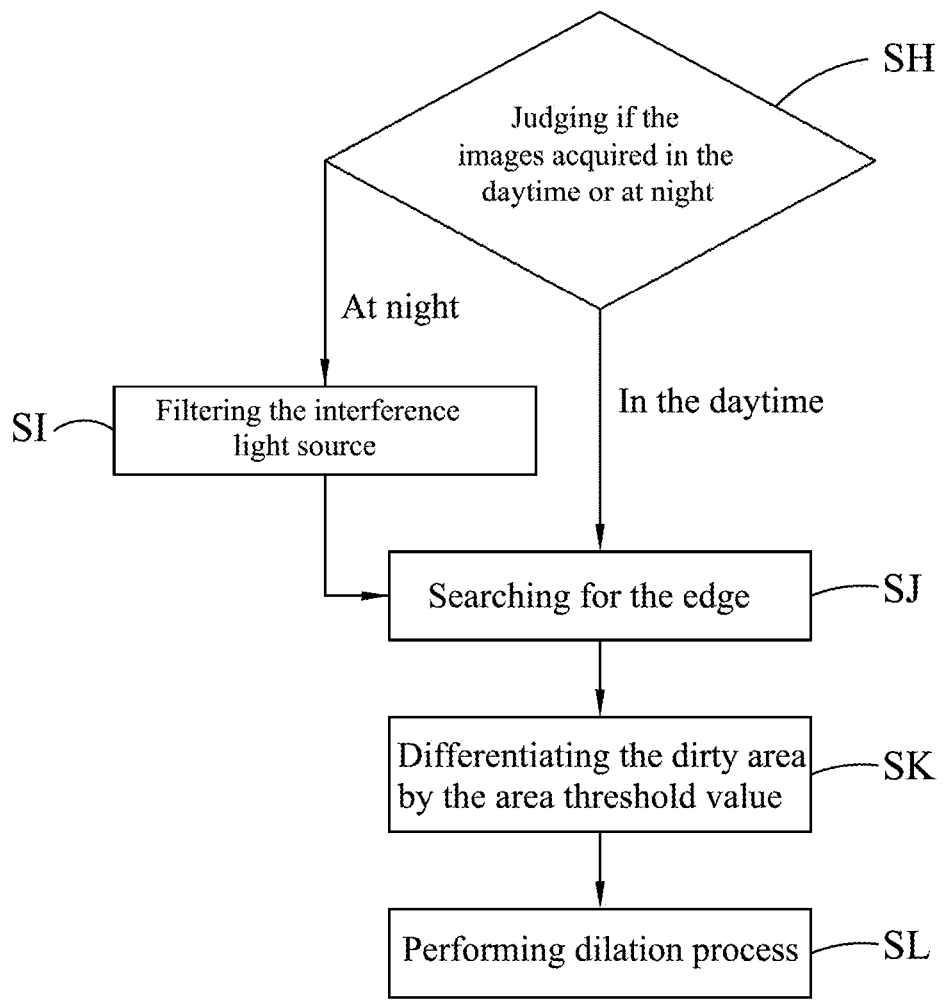
FIG. 7 is a schematic drawing of the flow chart showing the image segmentation method of the second embodiment of the disclosure.
Figure 8:
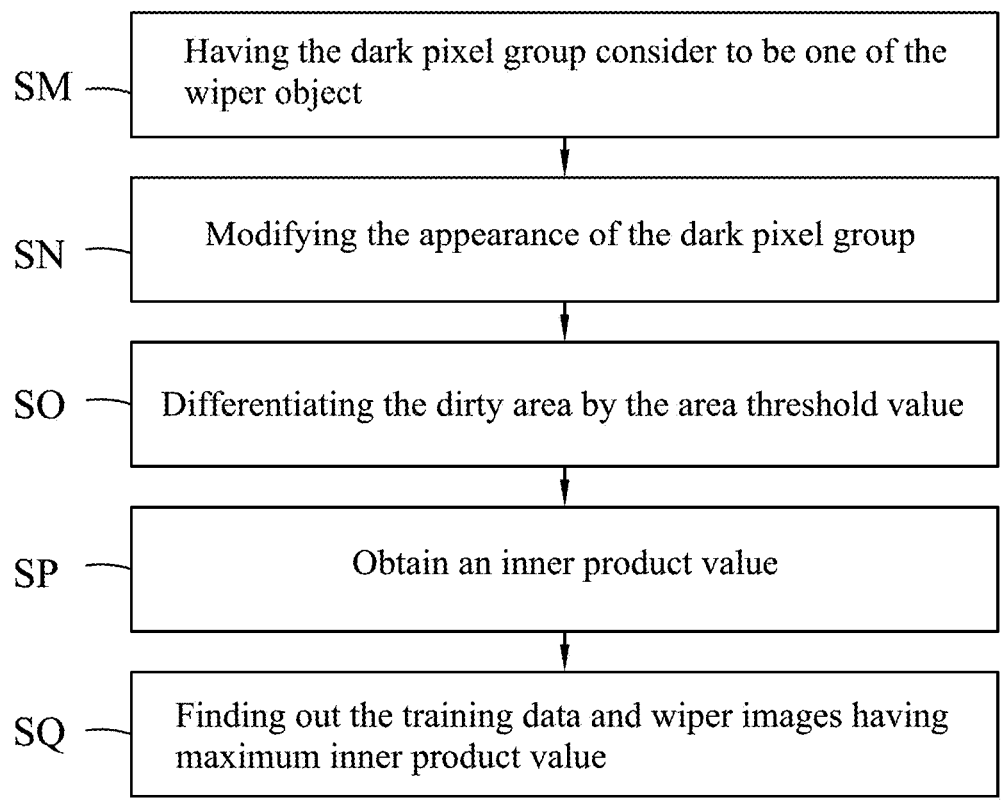
FIG. 8 is a schematic drawing of the flow chart showing the image segmentation method of the third embodiment of the disclosure.

FIG. 6 is a schematic drawing of the flow chart showing the image segmentation method of the first embodiment of the disclosure; FIG. 7 is a schematic drawing of the flow chart showing the image segmentation method of the second embodiment of the disclosure; while FIG. 8 is a schematic drawing of the flow chart showing the image segmentation method of the third embodiment of the disclosure. As shown in FIG. 6, FIG. 7, and FIG. 8, the steps of the image segmentation method are as follows:

Step SA: Extract green images, with a Bayer Filter, having the green images in the acquired plurality of images at a multiplicity of time point extract out. Since the images consists of three primary colors—red, green and blue, the burden for the operating unit (121) will be fear to increase if the operating unit (120) directly perform operation with respect to the three-primary-color images. Therefore, the operation is performed only with respect to a single color. In the present embodiment, in order to facilitate discourse, only the green color is employed. But it should be emphasized here that it is not intended to limit the disclosure in green color image, other single color images like red color image or blue color image can be employed to perform operation. In the following discourse, the green color image is employed to be a representative for the single color images. The Bayer Filter here will extract the selected single color image and filter off the non-selected single color images.

SB: green color image smoothing—is also called single color smoothing, having the green color image perform smoothing by a Median Filter. The Median Filter can be a 9×9 Median Filter. Since the edge of the images after being magnified or processed will become serrated or show blurry effect in the pixel due to algorithm, the image smoothing to make the edge of the image become smooth. The Median Filter in the image processing employed to remove the noise in the image or other signals can remove the high-frequency noise constituted by the component of the strong peak signal but still maintain the sharpness of the edge in the images.

The median filtering being a common step in image processing is especially useful for Speckle noise and Salt and pepper noise, particularly in maintaining edge characteristic in the situation that is not intended to appear edge blurry.

The median filtering has the images perform smoothing processing under the condition of not changing the image's pixel value structure.

SC: forming B-spline plot—having the smoothed green color image form a B-spline plot.

The B-spline is a very important parametric curve in computer graphic in the area of mathematical numerical analysis. The higher dimensional and generalized B-spline is call B-spline surface.

To depict further, at the sampling control point of image, firstly generate vertical B-spline by vertical control point, then generate horizontal B-spline by the use of these information, thereafter, the B-spline surface can be obtained.

The above-mentioned B-spline is generated by quadratic B-spline formula by the use of 3 control points to generate a segment of B-spline, the formula is as follows:

$$S_i(t) = \begin{bmatrix} t^2 & t & 1 \end{bmatrix} \begin{bmatrix} 0.5 & -1 & 0.5 \\ -1 & 1 & 0 \\ 0.5 & 0.5 & 0 \end{bmatrix} \begin{bmatrix} p_i - 1 \\ p_i \\ p_i + 1 \end{bmatrix}$$

for $t \in [0, 1]$, $i = 1, 2, \ldots, m - 2$, wherein $p_i-1$, $p_i$ and $p_i+1$ are control point furnished, $S_i$ is the $i^{th}$ B-spline segment, t is the time while m is natural number.

Figure 13:
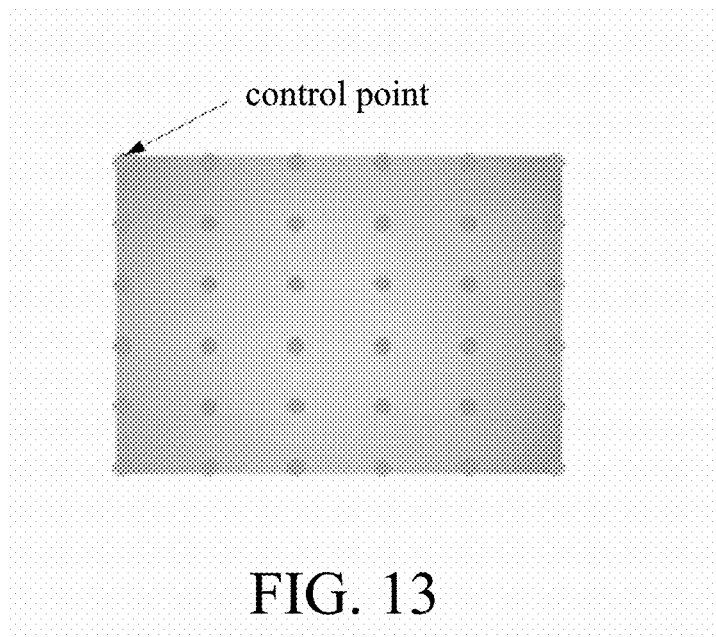
FIG. 13 is a schematic drawing of the sampling point of a B-spline of the disclosure.
Figure 14:
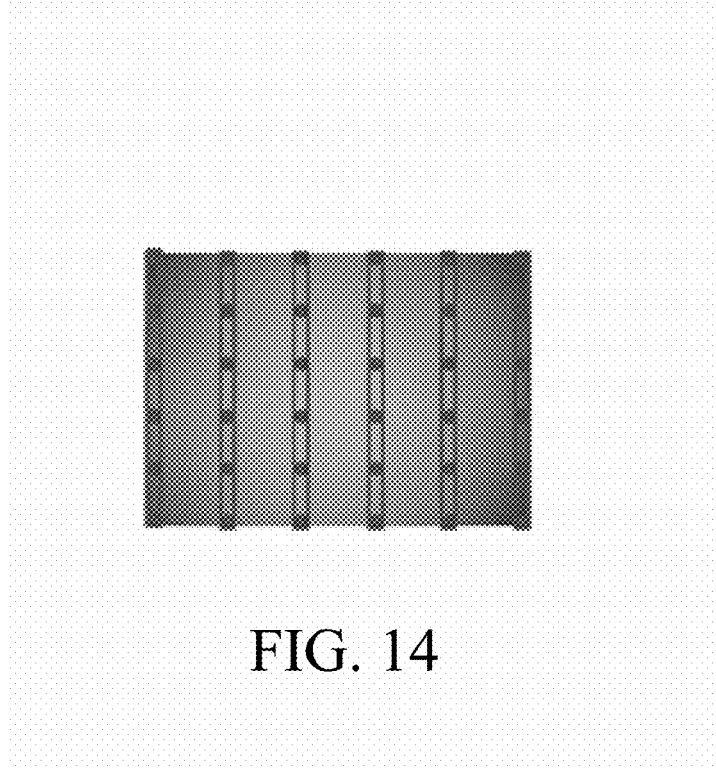
FIG. 14 is a schematic drawing of the sampling point of another B-spline of the disclosure.
Figure 15:
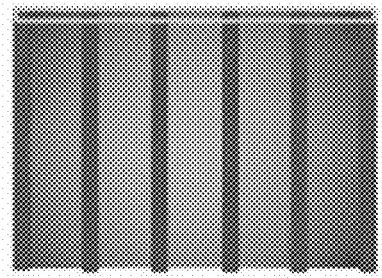
FIG. 15 is a schematic drawing of the sampling of a B-spline of the disclosure.
Figure 16:
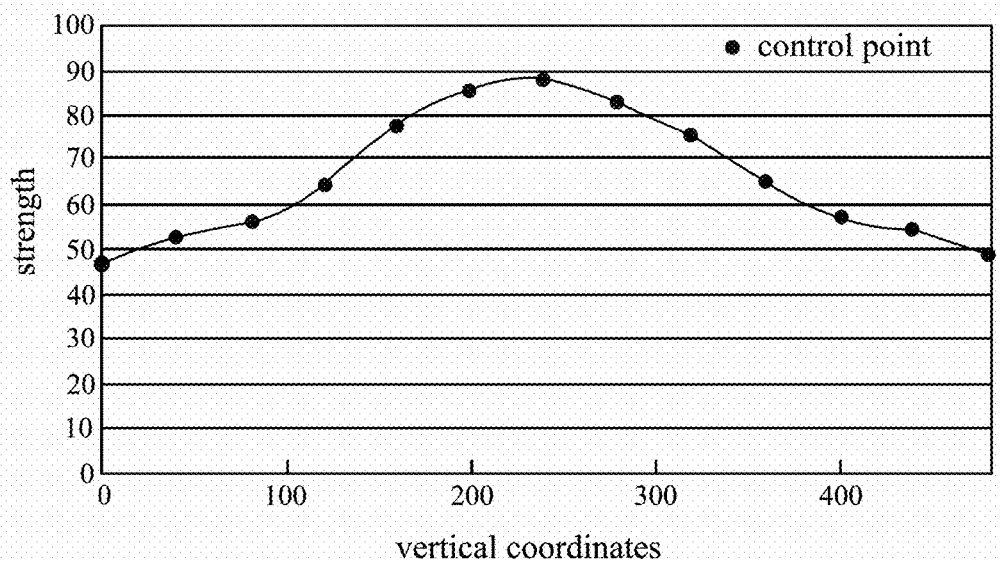
FIG. 16 is a schematic drawing of the vertical coordinate and intensity of a B-spline of the disclosure.

For instance, FIG. 13 is a schematic drawing of the sampling point of a B-spline of the disclosure; FIG. 14 is a schematic drawing of the sampling point of another B-spline of the disclosure; FIG. 15 is a schematic drawing of the sampling of a B-spline of the disclosure; while FIG. 16 is a schematic drawing of the vertical coordinate and strength of a B-spline of the disclosure. As shown in FIG. 13 through FIG. 16, the sampling control points shown in FIG. 13 are the plurality of points. Each column selects 6 pixels (M=6), while there are 6 columns (N=6). As shown in FIG. 14, in the light of each of the rectangular areas and control points therein, a respective vertical B-spline is generated. As shown in FIG. 15, horizontal B-spline is generated, in this way, all the strength of each pixel in the image can be obtained from each of the B-spline, and a B-spline surface can further be obtained. The horizontal B-spline is the hollow rectangle shown in FIG. 15. As shown in FIG. 16, the B-spline is a curve connected by each respective color strength value in each of the pixels. The above-mentioned statement is a simple discourse for example of the embodiment and is not for the limitation of the disclosure.

SD: image subtraction—Subtract the green color image after being smoothed from the B-spline plot to obtain at least a pixel plot occupied by the dirty noise in the primary image.

SE: Histogram Equalization—Histogram Equalization∘Employing Histogram Equalization to enhance the contrast of the occupied pixel plot of the primary image dirty noise, the bright pixel group of the pixel plot occupied by the primary image dirty noise after enhancing, the pixel group is then possessing the highest pixel value and is considered to be the possible ingredient of the dirty noise.

SF: Inpainting pixel group—having the pixel plot occupied by the primary image dirty noise perform correction by the way of erosion or dilation, if the bright pixel is relatively complete in the pixel plot occupied by the primary image dirty noise, then the outward appearance of the bright pixel group is relatively more completely corrected. But if bright pixel group appears relatively broken, then have the broken bright pixel group be eliminated.

SG: Differentiating the dirty area by the area threshold value—Having the pixel plot occupied by the corrected primary image dirty noise perform binarization. For all the bright pixel groups with binarization 1, it is the possible dirty pixel group while for the pixel group not containing dirty noise, the binarization is 0. In this way, the dirty area in the images can be differentiated to segment images.

FIG. 7 is a schematic drawing of the flow chart showing the image segmentation method of the second embodiment of the disclosure. As shown in FIG. 7, the segmentation method of the raindrop noise image includes the following steps:

SH: Judging if the image acquired is in daytime or at night—If it is at night, execute step SI, and if it is in the daytime, then execute step SJ.

SI: Filtering out the interference light source—If the acquired image is at night, filtering out the interference light source by a filter, then step SI is executed after the interference light source is filtered out. The interference light source can be car's headlight, street light, advertising light or light source from the buildings.

SJ: Searching for edge—Having the above-mentioned images of step SH or step SI highlight the edge of the possible raindrop noise by a Sobel Filter.

SK: Differentiating the dirty area by area threshold value—Having the result of step SK perform binarization with value "one" with respect to all the possible raindrop pixel groups while perform binarization with value "zero" with respect to those considered to be not containing raindrop pixel groups. By doing this, the raindrop area in the images is differentiated to segment images.

SL: Performing dilation process—Having the raindrop center pixel of the raindrop pixel group change from black to white to integrate the raindrop pixel group.

FIG. 8 is a schematic drawing of the flow chart showing the image segmentation method of the third embodiment of the disclosure. As shown in FIG. 8, the segmentation method of the wiper noise image includes the following steps:

SM: Having the dark pixel group consider to be as one of the wiper objects—Having all the pixels of the current image to be denoted, for instance, by the three primary colors (RGB) signals by a natural number average (K-mean) operation method For further explanation, the above-mentioned natural number average operation method, also called K-mean (K average operation method), i.e. is a kind of cluster which is basically performed by the way of "Thing is gathered by the same kind", which perhaps can be imagined as "similar things have similar features", giving a group of data, having them classified a K kinds, where K is a preset value.

Therefore, the K average operation method originates a kind of vector quantized method, nowadays, more to be acted as a kind of cluster analysis method that is popular in data exploration area. The objective of the K average cluster is: having n points, which can be an one-time observation or a example item, classified into K clusters to make every point belong to a nearest average value, this is the cluster center, the corresponding cluster, have it to be cluster criteria. The formulas are as follows:

Known observation set $(x_1, x_2, \ldots, x_n)$, where each of the observation is a d-dimensional real vector, the K average cluster will have n observation classified into K set (K≤n), making the square sum the minimum, $\mu_i$ is an average value of all points among $S_i$.

$$\arg\min_S \sum_{i=1}^{k} \sum_{x \in S_i} \|x - \mu_i\|^2$$

$$S_i^{(t)} = \{x_p : \|x_p - m_i^{(t)}\|^2 \leq \|x_p - m_j^{(t)}\|^2 \; \forall \; j, 1 \leq j \leq k\}$$

wherein, each $x_p$ is distributed to a definite cluster $S^t$, which is possibly distributed to two or more clusters.

$$m_i^{(t+1)} = \frac{1}{|S_i^{(t)}|} \sum_{x_j \in S_i^{(t)}} x_j$$

An image center of the each of the cluster observed value in the clusters is obtained by calculation in the above-mentioned step.

SN: Inpainting the appearance of the dark pixel group. Having the results obtained by the above-mentioned step SM eliminate the relatively broken dark pixel groups of the current images by the operation methods such as erosion, dilation etc. and modify the appearance of dark pixel groups, that are relatively integrated, to be more integrated. Since the shape of the wiper is integrated while the other obstacles such as shadows, are possibly broken in shape, therefore, the step SN aims at eliminating the broken dark pixel groups and modifying the ones such as wiper object having more integrated appearance.

SO: Differentiating the dirty area by the area threshold value. Having the results obtained from the step SN perform binarization.

Having the result of step SK perform binarization with value "one" with respect to all the possible raindrop pixel groups while perform binarization with value "zero" with respect to those considered to be not containing raindrop pixel groups. With p and q as positive integers, performing down-sampling process until the total quantity of pixel becomes P to figure out that the total quantity of pixel becomes q with binarization value "one". q/p is the average value of the binarization wiper image. Having the p pieces of matrix pixels subtract the average value and have the resulted matrix to be vectorized to become column and perform down-sampling to obtain a vector I.

The down-sampling is to have the pixels of the original images reduce, for instance, if the original images are 750 pieces of pixels, the number of pixel after performing down-sampling possibly becomes 350.

The area threshold value being a value is used for differentiating some characteristics to see if they meet the requirements. Therefore, the area threshold value will have different adaptive values depending on different environment. For instance, the gray-scale value size is 0~255 (black~white), if a fixed gray-scale value of 70 is set to be the area threshold value, by the use of this area threshold value to have the this piece of gray-scale image perform binarization which represents: have the gray-scale value of each pixel of this piece of image perform judgment, if it is greater than 70, then it is set to be 1 while if it is less than 1, then it is set to be 0. Finally a binarization image is obtained where there is only 1 or 0 for the pixel value and there is only white or black for the color.

SP: Gaining an inner product value (dot product value)
○Having the vector I and the Eigen Wiper Matrix U compute according to the following formula (1) to gain its inner product (dot product) value:

$$I^t U \tag{1}$$

In the present embodiment, the solution for the Eigen Wiper Matrix U is to employ the operation method of the Principal Component Analysis. Firstly, collecting N pieces of training images where N is a positive integer, the training integer contains two wiper images, and label off the wiper's position for each piece of images. Therefore, in each piece of training images, the plurality of coordinate points in the plurality of wiper pixels is a known one.

In other embodiment, if the wiper used by the vehicle furnished with the forward view safety warning system of the embodiment and the installed angle of its camera make the size, position and appearance appeared in the images of the wiper different from those of the preset training images, where the preset training images contain wiper images, then an automatic man-machine training mode can be designed. The embodiment being: Placing a pure-white background object, such as pure-white poster, in front of the camera making the images acquired by the camera be a whole-white image, when it comes to turning on the wiper, the performed steps of SM and SN can be automatically acquired or learning wiper images for later use without being interfered by any noise.

Having the above-mentioned plurality of wiper images perform the process of step SO, and having the processed results arrange into observation matrix, its dimension being P×N. The following formula (2) is solved by employing Singular Value Decomposition $$O=UDVt \quad O=UDV^t \tag{2}$$

Wherein U is Eigen Wiper Matrix U and its dimension is P×N; D is the diagonal matrix with dimension N×N which records the importance and prominence of each of the Eigen Wiper while V records the projected coefficient of the N pieces of training images with dimension N×N.

SQ: Finding out the training information and the wiper images that possess maximum inner product value (i.e. dot product value). Finding out the training information that possess maximum inner product value (i.e. dot product value) and its corresponding original wiper images, the wiper's positions are all known since the N piece of training information are found out beforehand.

S2: Judging if each of the current images contains noise pixel. In an embodiment, if the quantity of the noise pixel in the certain current image is greater than the preset threshold value, then Step S3 while if the quantity of the noise pixel in the certain current image is less than the preset threshold value, then the judgment is that the current images do not contain noise. A inpainting processing is required since noise contained in the current images that passes the threshold value will result in relatively large affection with respect to the safety warning system.

In another embodiment, if the maximum value of the N pieces of inner product value, computed by the use of $I^tU$, of the corresponding I of the current images P(t) is greater than the preset threshold value, then the judgment is that the current images P(t) contains the wiper object and the Step S3 will be processed, but if the maximum value of the N pieces of inner product value, computed by the use of $I^tU$, of the corresponding I of the current images P(t) is less than the threshold value, then the judgment is that the current images do not contain wiper object. If the dark pixel group in P(t) does not meet the wiper's shape of N pieces of training information, then the N pieces' inner product values computed in accordance with $I^tU$ are relatively smaller.

S3: Judging if each of the current images that contain noise is subjected to inpainting process, if not, then enter Step S4, if yes, then the inpainting process will not be performed.

S4: Performing inpainting in light of the images that contain noise. Resolving the pixel corresponding relationship between the current images and the reference images and performing image inpainting process, up to now, the flow chart of the mutual inpainting method of the plurality of images has been accomplished. The above-mentioned corresponding relationship can be considered as a geometric relationship, that is a corresponding relationship between two images (P1, P2), for instance, can be a transformation matrix or an offset map, therefore, P1(x, y)=P2 (X, Y) where P is pixel, and (x, y) or (X, Y) is coordinate position.

When it comes to inpainting, the current plurality of pixels of the formed noise in the images that contain noise cannot be directly performed inpainting by the plurality of pixels at the same position in the reference images because in the plurality of camera frameworks, all the images exits a small parallax.

In the above-mentioned embodiments, they employ offset map or transformation equation of any of the inpainting pixels sufficient to describe the corresponding relationship between two images to model the pixel corresponding relationship between two different images (i.e. the current image that contains noise and the reference image). That is to say, as far as the arbitrary pixel position of images is concerned, the offset map can depict that this pixel value of the pixel position can be performed inpainting by employing the pixel value of a certain position of the reference image to accomplish relatively natural result.

Figure 9:
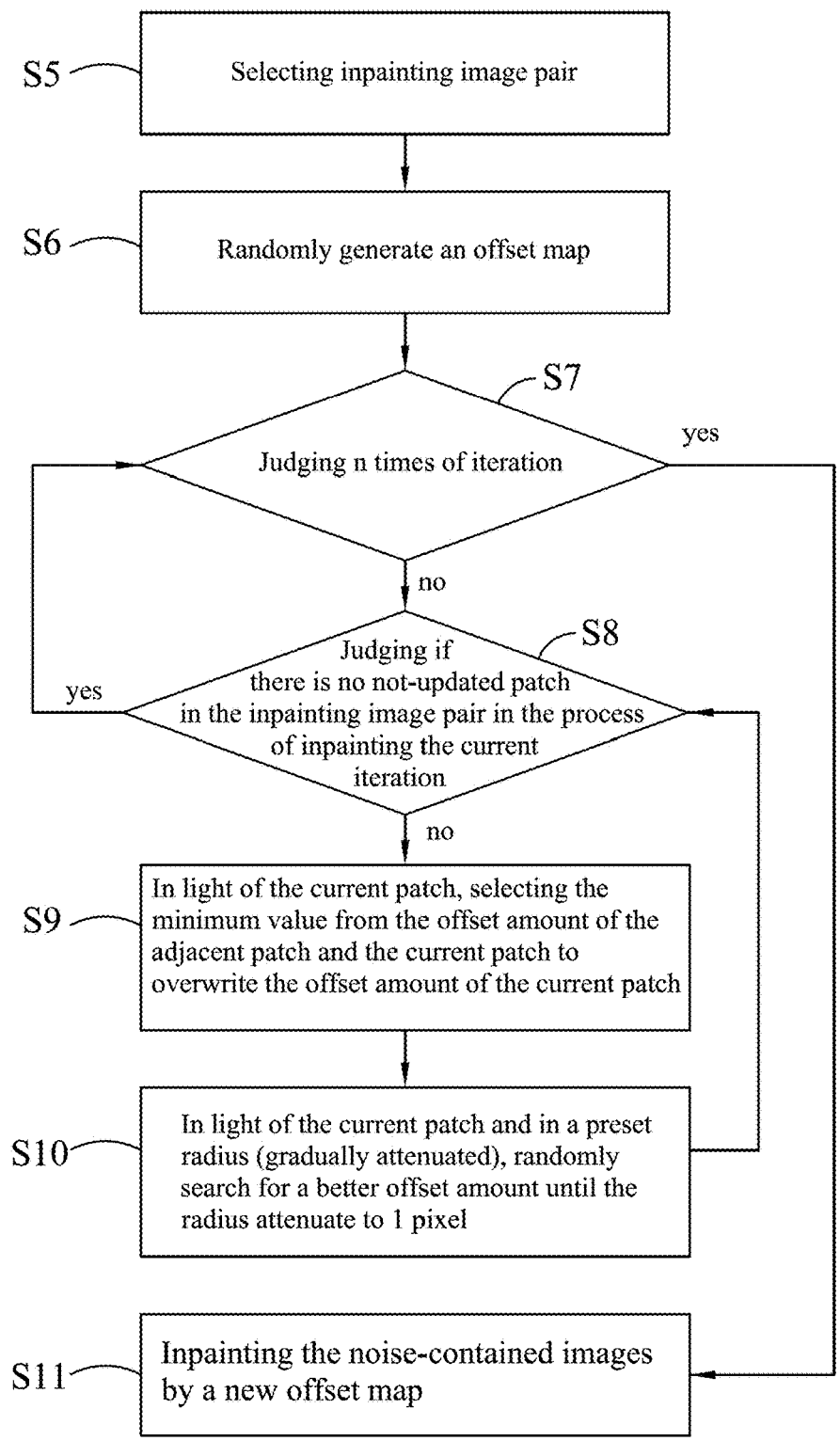
FIG. 9 is a schematic drawing of the flow chart showing the method employing offset map and image inpainting of the disclosure.

FIG. 9 is a schematic drawing of the flow chart showing the method employing offset map and image inpainting of the disclosure. As shown in FIG. 9, the method includes the following steps:

S5: Select the inpainting image pair. Selecting the image having no noise and having minimum parallax to perform pairing with the noise-contained image by choosing the already-known camera's relative relationship, and this pairing is an inpainting image pair, where the camera mentioned here is the above-mentioned camera unit (110).

S6: Randomly generate an offset map. Generating an initial random offset map of an inpainting image pair by the use of an Independent Uniform Sampling method or any random method capable of performing randomly sampling pixel point in the reference image to generate an initial random offset map of the inpainting image pair, for further discourse, in the size of the reference image, employing the Independent Uniform Sampling to randomly generate an offset amount of each of the pixels in the offset map.

S7: Judging the n times iteration. Judging if the inpainting images is performed first-time iteration, if not, proceed to Step S8, with n as a constant, the number of iteration is progressed until n times. Judging if the inpainting image pair from the Step S8 perform n times of iteration, if yes, proceed to Step S11, if not, then proceed to Step S8.

The iteration being an activity of repeated feedback process has the object of approaching and reaching the required target or result. Each time, the repeated procedure with respect to the process is called one time iteration, and the result obtained for each times of iteration will be employed as an initial value of the next iteration.

S8: Judging if there is no not-updated patch in the inpainting image pair in the process of inpainting the current iteration. If yes, then the inpainting image pair from Step S7 has already performed the current iteration, and updating the patch and proceed back to the Step S7. If the inpainting image pair from Step S7 has no current iteration and no updating patch is performed, then proceed to Step S9.

S9: In light of the current patch, selecting the minimum value from the offset amount of the adjacent patch and the current patch to overwrite the offset amount of the current patch. Updating every patch and defining the current patch offset amount in the noise-contained images as f(x,y), and D(v) is distance between the current patch (x,y) and the patch (x,y)+v in the reference images, then searching for the minimum offset amount in the adjacent patches to coverwrite current patch offset amount as the following formula (3):

$$f(x,y)=\{D(f(x,y)),D(f(x-1,y)),D(f(x,y-1))\} \quad (3)$$

S10: In light of the current patch and in a preset radius (gradually attenuated), randomly search for a better offset amount until the radius attenuate to 1 pixel, thereafter, randomly searching by a diminishing radius area to update current patch offset amount f(x, y). As shown in formula (4), wherein $R_i$ is a random value in the interval $[-1,1]\times[-1,1]$, w w is the maximum searching radius, $\alpha$ is a diminishing ratio, i is the number of searching times which persistently increases from 0 till that the searching radius $w\alpha^i$ is less than 1 pixel and proceed back to Step S8 again.

$$u_i=f(x,y)+w\alpha^i R_i \quad (4)$$

S11: Inpainting the noise-contained images by a new offset map. Having the noise pixel group in the noised contained image by the use of the 2-piece of image pair corresponding relationship contained by the offset map perform inpainting by the reference images, for instance, if $N_t$ is at the noise position in the noise-contained images, then perform inpainting with respect to the nose by the use of offset map to search for the pixel value of the corresponding position $DN_t$ in the reference images.

Figure 10:
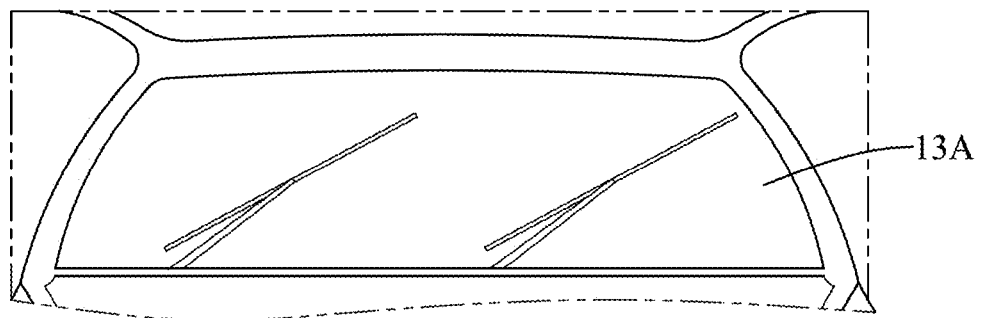
FIG. 10 is a schematic drawing showing the wiper inpainting of the disclosure.
Figure 10:
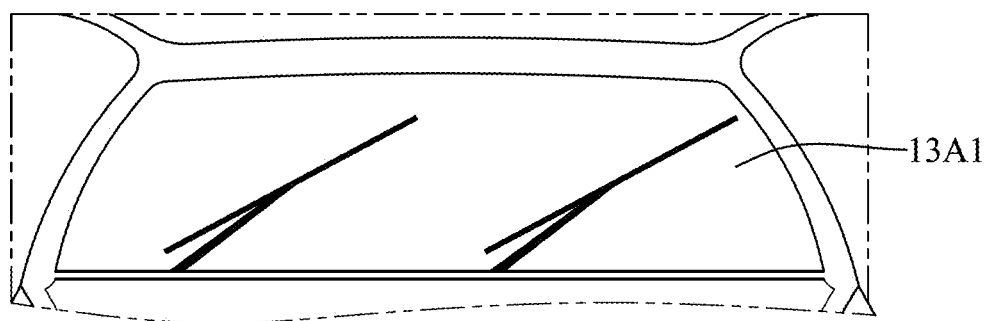
Figure 10:
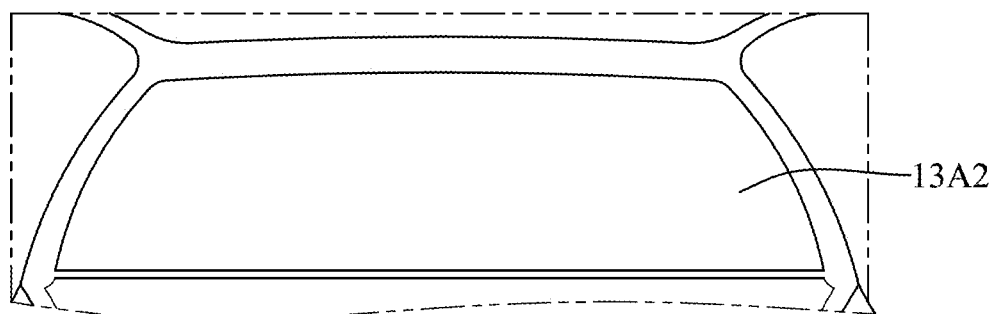

FIG. 10 is a schematic drawing showing the wiper inpainting of the disclosure. As shown in FIG. 10, a inpainting image pair's image 13A is blocked by the wiper object, but the shield area of the wiper object in the image pair is different, The above-mentioned plurality and overlapped area of the image inpainting system and method of the disclosure is capable of detecting noise 13A1 and inpainting the image group that is blocked by the wiper image in the other images to obtain the image 13A2 after being performed inpainting, thereby, the image 13A2 after being performed inpainting has no wiper image anymore, and the image will not be blocked by the wiper image.

Figure 11:
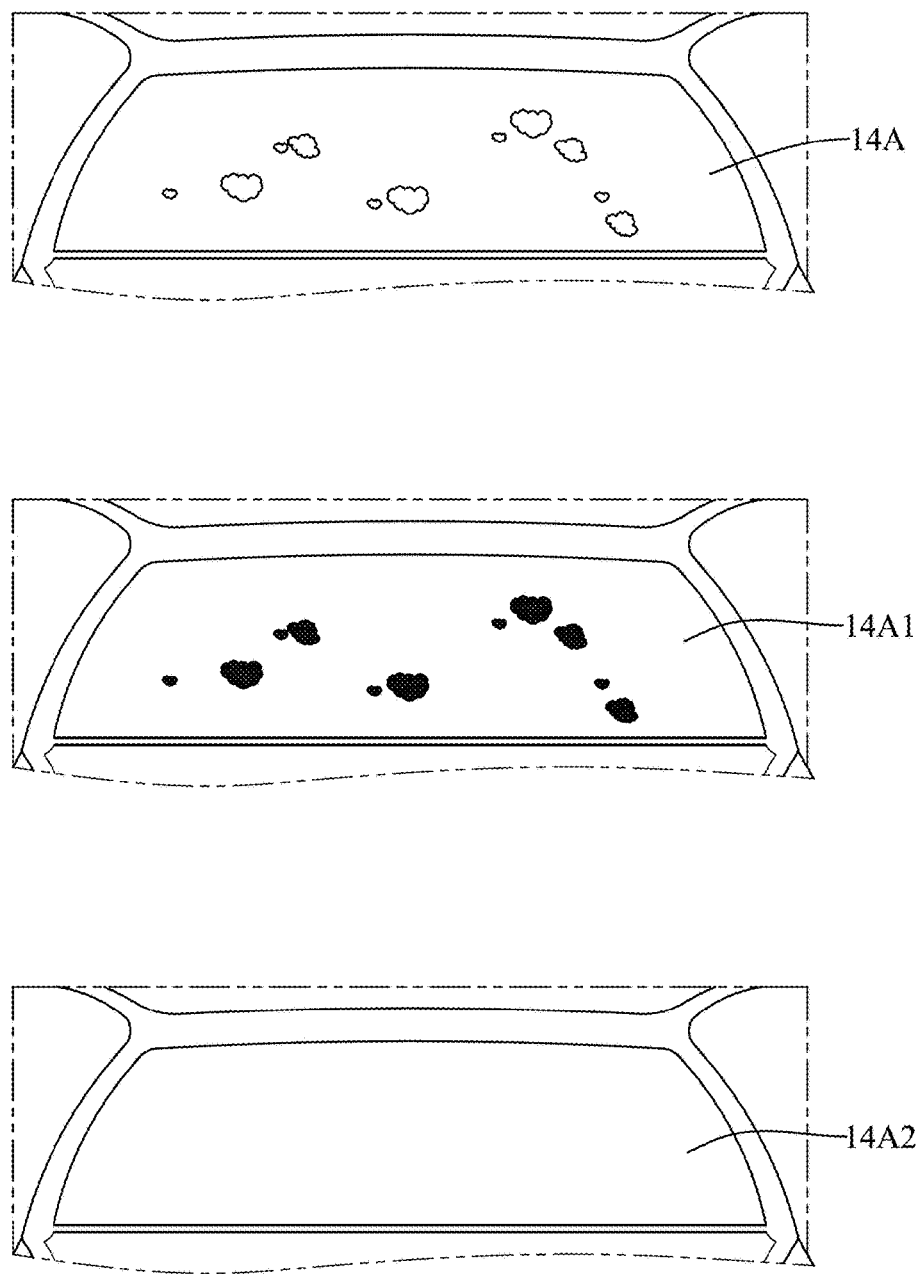
FIG. 11 is a schematic drawing showing the dirty inpainting of the disclosure.

FIG. 11 is a schematic drawing showing the dirty inpainting of the disclosure. As shown in FIG. 11, the dirty image 14A appears at least a dirty appeared in an image. The above-mentioned plurality and overlapped area of the image inpainting system and method of the disclosure is capable of detecting noise 14A1 and inpainting the image group that is blocked by the wiper image in the other images to obtain the image 14A2 after being performed inpainting, thereby, the image 14A2 after being performed inpainting has no dirty image anymore, and the image will not be blocked by the dirty image.

Figure 12:
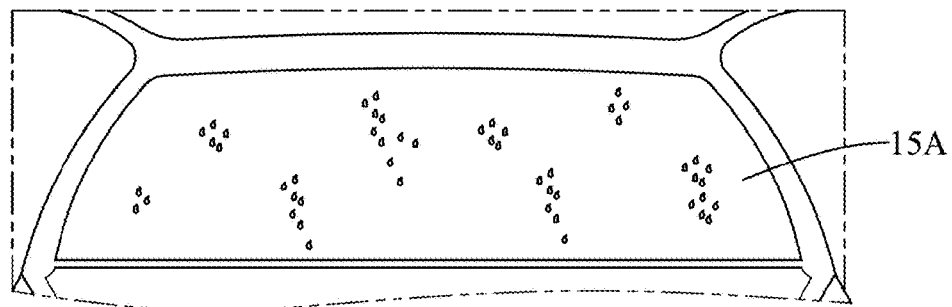
FIG. 12 is a schematic drawing showing the raindrop inpainting of the disclosure.
Figure 12:
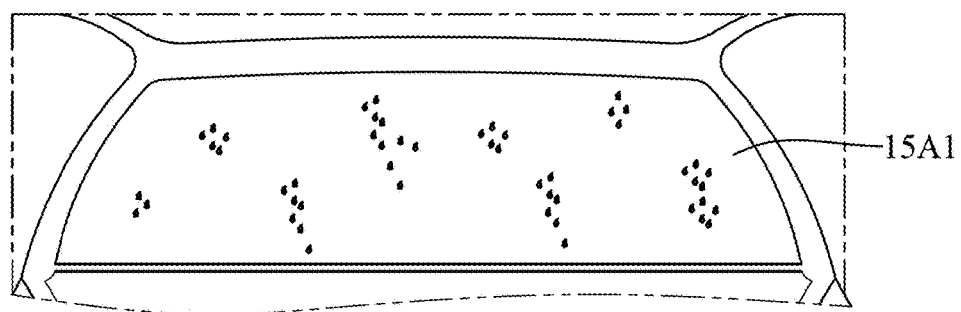
Figure 12:
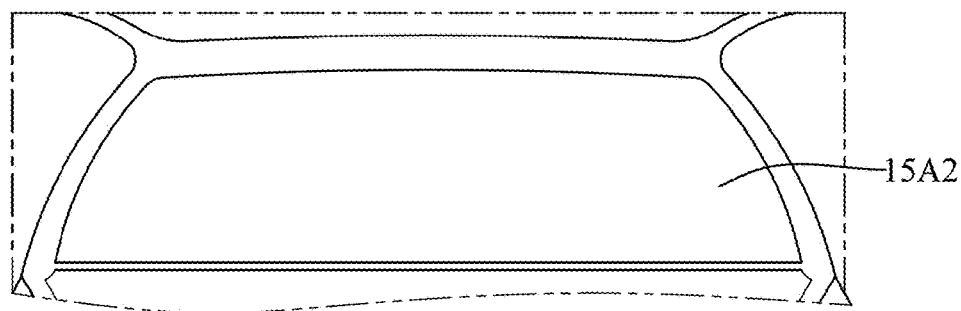

FIG. 12 is a schematic drawing showing the raindrop inpainting of the disclosure. As shown in FIG. 12, the rain drop image 15A appears at least a raindrop in an image. The above-mentioned plurality and overlapped area of the image inpainting system and method of the disclosure is capable of detecting noise 15A1 and inpainting the image group that is blocked by the wiper image in the other images to obtain the image 14A2 after being performed inpainting, thereby, the image 15A2 after being performed inpainting has no raindrop image anymore, and the image will not be blocked by the raindrop image.

To summarize the above-mentioned statement, in the real time application, the reference image used for inpainting can be any of the previously acquired images sufficient to perform the current image while in the non-real time application, the reference image used for inpainting can be any of the previously acquired images sufficient to perform the current image or any images acquired a little bit later.

Besides, the plurality and overlapped area of the image inpainting system and method of the disclosure can be used in any devices having the operation function, for instance, desk-top PCs, tablet PCs, intelligent phone, and notebook RF power coupling structure etc.

Moreover, the disclosure can eliminate the noise (e.g. raindrop) in the images even in rainy days, the recognition rate of all kinds of safety warning system can still be maintained, thereby, the safety of the driver can then be improved.

Furthermore, the disclosure has the advantage that although the plurality of images have parallax (difference in view angle), the image time is the same, therefore, when it comes to image inpainting, the plurality of images can be used in the same time. For this reason, the truth of the image safety warning system can be guaranteed.

What is more, the disclosure can determine if the mutual inpainting method of the plurality of images of the present embodiment needs to be executed or not. In this way, the burden of system operation can be lowered and the rate of misjudgment can be reduced.

What is more, when it comes to having noise interference, the disclosure is capable of detecting and performing inpainting the noise pixel group by employing the techniques of image segmentation and image inpainting. In other words, the disclosure is capable of inpainting the images blocked by the noise making the obstacle recognition without being subjected to the affection of noise such as raindrop etc. In this way, the recognition rate of the obstacle can be improved.

It will become apparent to those people skilled in the art that various modifications and variations can be made to the structure of the disclosure without departing from the scope or spirit of the disclosure. In view of the foregoing description, it is intended that all the modifications and variation fall within the scope of the following appended claims and their equivalents.

What is claimed is:
1. An image inpainting system, comprising:
a camera module for acquiring a plurality of images; and
an inpainting module coupled to the camera module for receiving the plurality of images from the camera module and having the plurality of images perform a noise detection where the plurality of images are segmented into noise-contained pixel images and non-noise-contained pixel images, confirming the positions of every noise pixel of the noise pixel images, finding out the offset map and geometric relationship of the pixel corresponding relationship without being subjected to the affection of noise and having the pixel corresponding relationship with minimum parallax, making use of the offset map or the geometric relationship to extract corresponding pixel that is not subjected to the affection of noise, performing inpainting and substituting the noise pixel in the plurality of images to generate at least a synthetic image without containing noise;
wherein the image inpainting module is configured to make use of the offset map and inpainting image by:
selecting an inpainting image pair, selecting the image having no noise and having minimum parallax to perform pairing with the noise-contained image by choosing the already-known camera's relative relationship, and this pairing is an inpainting image pair;
randomly generating an offset map, generating an initial random offset map of an inpainting image pair by the use of an Independent Uniform Sampling method or any random method capable of performing randomly sampling pixel point in the reference image to generate an initial random offset map of the inpainting image pair;
judging the n times iteration, judging if the inpainting images is performed first-time iteration, if not, proceed to the next Step, with n as a constant, the number of iteration is progressed until n times; judging if the inpainting image pair from the next Step perform n times of iteration, if yes, proceed to Step of inpainting the noise-contained images by a new offset map;
judging if there is no not-updated patch in the inpainting image pair in the process of inpainting the current iteration, If yes, then the inpainting image pair from the previous Step has already performed the current iteration, and updating the patch and proceed back to the previous Step, if the inpainting image pair from the previous Step has no current iteration and no updating patch is performed, then proceed to the next Step;

in light of the current patch, selecting the minimum value from the offset amount of the adjacent patch and the current patch to overwrite the offset amount of the current patch;

in light of the current patch and in a preset radius, randomly searching for a better offset amount until the radius attenuate to 1 pixel, and proceed back to the step of judging if there is no not-updated patch in the inpainting image pair in the process of inpainting the current iteration is performed in the inpainting image pair; and inpainting the noise-contained images by a new offset map.

2. The image inpainting system as claimed in claim 1, wherein the camera module possesses at least two camera units that are arranged in array mode.

3. The image inpainting system as claimed in claim 2, wherein the camera unit is an image sensor, an infrared image acquisition device, optical sensing element of either an optoelectronic coupling element or a complementary metal-oxide semiconductor, or at least a combination of both.

4. The image inpainting system as claimed in claim 1, wherein the inpainting module has a receiving unit, an operating unit and a storage unit wherein the receiving unit is signally connected to the camera module, the operating unit is signally connected to the receiving unit while the storage unit is signally connected to the operating unit.

5. The image inpainting system as claimed in claim 1, wherein the inpainting module has the plurality of images perform a noise pixel detection, and the noise pixel is one of the wiper pixel, raindrop pixel or dirty pixel or at least a combination of the arbitrary two of them.

6. An image inpainting method, comprising the following steps:

segmenting image, acquiring a plurality of images, and having the plurality of images segmented into noise-contained pixel images and non-noise-contained pixel images, and confirming the positions of every noise pixel of the noise pixel image;

performing inpainting in light of the noise-contained pixel images, finding out an offset map and geometric relationship of the pixel corresponding relationship without being subjected to the affection of noise and having the pixel corresponding relationship with minimum parallax, making use of the offset map or the geometric relationship to extract corresponding pixel that is not subjected to the affection of noise, performing inpainting and substituting the noise pixel in the plurality of images to generate at least a synthetic image without containing noise;

selecting an inpainting image pair, selecting the image having no noise and having minimum parallax to perform pairing with the noise-contained image by choosing the already-known camera's relative relationship, and this pairing is an inpainting image pair;

randomly generating an offset map, generating an initial random offset map of an inpainting image pair by the use of an Independent Uniform Sampling method or any random method capable of performing randomly sampling pixel point in the reference image to generate an initial random offset map of the inpainting image pair;

judging the n times iteration, judging if the inpainting images is performed first-time iteration, if not, proceed to the next Step, with n as a constant, the number of iteration is progressed until n times; judging if the inpainting image pair from the next Step perform n times of iteration, if yes, proceed to Step of inpainting the noise-contained images by a new offset map;

judging if there is no not-updated patch in the inpainting image pair in the process of inpainting the current iteration, If yes, then the inpainting image pair from the previous Step has already performed the current iteration, and updating the patch and proceed back to the previous Step, if the inpainting image pair from the previous Step has no current iteration and no updating patch is performed, then proceed to the next Step;

in light of the current patch, selecting the minimum value from the offset amount of the adjacent patch and the current patch to overwrite the offset amount of the current patch;

in light of the current patch and in a preset radius, randomly searching for a better offset amount until the radius attenuate to 1 pixel, and proceed back to the step of judging if there is no not-updated patch in the inpainting image pair in the process of inpainting the current iteration is performed in the inpainting image pair; and inpainting the noise-contained images by a new offset map.

7. The image inpainting method as claimed in claim 6, wherein the noise pixel is one of the wiper pixel, raindrop pixel or dirty pixel or at least a combination of the arbitrary two of them.

8. The image inpainting method as claimed in claim 6, wherein the step of Segmenting image contains a dirty image segmentation method that further comprising the following steps:

extracting single color image, having the single color image of the plurality of images extract out;

smoothing the single color image, having the single color image perform smoothing by a Median Filter;

forming B-spline plot, having the smoothed single color image form a B-spline plot;

performing image subtraction, subtracting the single color image after being smoothed from the B-spline plot to obtain at least a pixel plot occupied by the dirty noise in the primary image;

performing Histogram Equalization, Employing Histogram Equalization to enhance the contrast of the occupied pixel plot of the primary image dirty noise;

inpainting the pixel group, having the pixel plot occupied by the primary image dirty noise perform correction by the way of erosion or dilation; and differentiating the dirty area by the area threshold value, having the pixel plot occupied by the corrected primary image dirty noise perform binarization to segment images.

9. The image inpainting method as claimed in claim 8, wherein the single color image is a green color image, a red color image or a blue color image.

10. The image inpainting method as claimed in claim 8, wherein in the step of differentiating the dirty area by the area threshold value, if the binarization is 1 for all the bright pixel groups in the pixel plot occupied by the primary image dirty noise, it is the possible dirty pixel group while for the pixel group without containing dirty noise, the binarization is 0, by mean of this, the dirty area in the image is differentiated for segmenting images.

11. The image inpainting method as claimed in claim 8, wherein in the step of inpainting the pixel group, if the bright pixel in the pixel plot occupied by the primary image dirty noise is relatively integrated, ten have the appearance of the bright pixel group to be modified to become more integrated, but if the bright pixel group is relatively broken, then eliminate the broken pixel group.

12. The image inpainting method as claimed in claim 8, wherein in the step of Histogram Equalization, the bright pixel group occupied by the primary image dirty noise after being enhanced is considered to be a possible ingredient of the dirty noise.

13. The image inpainting method as claimed in claim 6, wherein the step of Segmenting image being containing a raindrop noise image segmentation method further comprising the following steps:
   judging if the image acquired is in daytime or at night, if it is at night, performing the step of filtering out the interference light source, and if it is in the daytime, then execute step of searching for the edge;
   searching for the edge, having the above-mentioned results of the step of judging if the acquired image is at night or in the day time and of the step of filtering out the interference light source, highlighting the edge of the raindrop noise by a Sobel Filter;
   differentiating the dirty area by area threshold value, having the result of step of searching for the edge perform binarization; and
   performing dilation process, having the raindrop center pixel of the raindrop pixel group change from black to white to integrate the raindrop pixel group.

14. The image inpainting method as claimed in claim 13, wherein in the above-mentioned inpainting method, the step of differentiating the dirty area by the area threshold value, the binarization is 1 in light of all possible raindrop pixel group while the binarization is 0 in light of the raindrop pixel group considered not to contain raindrop, by mean of this, the raindrop area is differentiated to segment images.

15. The image inpainting method as claimed in claim 13, wherein in the step of filtering the interference light source, the filter is a high flux filter, the interference light source is a headlight, a street light, an advertising light or the light source from the buildings.

16. The image inpainting method as claimed in claim 6, wherein the step of Segmenting image contains a raindrop noise image segmentation method which further comprises the following steps:
   having the dark pixel group consider to be as one of the wiper objects;
   inpainting the appearance of the dark pixel group, having the result of performing the step of considering the dark pixel group to be one of the wiper object eliminate the relatively broken dark pixel group in the current images by the use of the operation methods of erosion, dilation etc., and having the appearance of relatively integrated dark pixel group perform inpainting to make it become relatively integrated;
   differentiating the dirty area by the area threshold value, having the result of performing the step of inpainting the appearance of the dark pixel group perform binarization to obtain a vector;
   gaining an inner product value, the inner product (dot product) value is gained from the vector and Eigen Wiper Matrix obtained from the process of "differentiating the dirty area by the area threshold value"; and
   finding out the training information and wiper images having maximum inner product (dot product) value.

17. The image inpainting method as claimed in claim 16, wherein in the step of having the dark pixel group consider to be one of the wiper object, if K is a natural number, having all the pixels of the current images divide into K groups and having the dark pixel group consider to be one of the possible ingredient of the wiper object, the dark pixel group is a pixel group that possesses minimum three-primary-color signals.

18. The image inpainting method as claimed in claim 16, wherein in the step of differentiating the dirty area by the area threshold value, the binarization is 1 in light of all possible wiper pixel group while the binarization is 0 in light of the pixel group considered not to contain wiper object, then perform a down-sampling process to obtain the vector.

19. The image inpainting method as claimed in claim 6, further comprising a step of judging if each of the current images contain noise pixel, if the amount of each of the noise pixel of all the current images is less than a threshold value, then a judgment is made that the current image does not contain noise.

20. The image inpainting method as claimed in claim 18, further comprising a step of judging if each piece of all the current noise-contained images are subjected to inpainting processing, if not, performing the inpainting in light of the noise-contained images; if yes, no inpainting processing is performed; also in the step of judging if each of current images contains noise pixel, if the amount of the noise images in a certain current image is greater than a preset threshold value, then proceed to the step of judgment that each piece of all the current noise-contained images are subjected to inpainting processing.

21. The image inpainting method as claimed in claim 6, wherein before performing the step of segmenting the image, as the wiper is turned on, an inpainting module receives a starting signal to perform the step of segmenting the image.

* * * * *